United States Patent [19]

Koenig

[11] Patent Number: 4,579,385
[45] Date of Patent: Apr. 1, 1986

[54] SUNSHADE AND PROTECTIVE DEVICE

[76] Inventor: Catherine L. Koenig, 20362 Acacia, Santa Ana, Calif. 92707

[21] Appl. No.: 620,313

[22] Filed: Jun. 13, 1984

[51] Int. Cl.$^4$ .......................... A47C 7/10; A47C 31/00
[52] U.S. Cl. ..................................... 297/184; 297/464; 297/488
[58] Field of Search ...................... 135/DIG. 6, 88, 96; 297/487, 488, 184, DIG. 3, 220, 464; 5/414, 416, 454, 455; 296/97 R, 97 B; 280/746, 32.5

[56] References Cited

U.S. PATENT DOCUMENTS

| | | | |
|---|---|---|---|
| 2,656,844 | 10/1953 | Kreuzer | 5/416 |
| 3,218,103 | 11/1965 | Boyce | 297/464 X |
| 3,265,438 | 8/1966 | Regan et al. | 297/464 |
| 3,873,117 | 3/1975 | Perego | 280/47.38 |
| 3,918,759 | 11/1975 | Gesslein | 280/47.38 |
| 4,206,945 | 6/1980 | Kifferstein | 297/220 |
| 4,293,162 | 10/1981 | Pap et al. | 135/96 X |
| 4,311,339 | 1/1982 | Heath | 297/487 |
| 4,314,727 | 2/1982 | Potts | 297/184 |
| 4,459,714 | 7/1984 | Lin | 5/455 |

Primary Examiner—James T. McCall
Attorney, Agent, or Firm—Hubbard, Stetina & Brunda

[57] ABSTRACT

This invention provides a sunshade and protective cushion device for use with a conventional automobile child seat for an infant or small child. The device includes a pair of peripherally joined flexible sheets and a valve for permitting pressurization of the airspace between the sheets. The device may be attached between the seatback and front retainer bar of the child seat to substantially cover the occupant. A pair of flaps extend from the sheets to shield the occupant from laterally incident sunlight.

7 Claims, 6 Drawing Figures

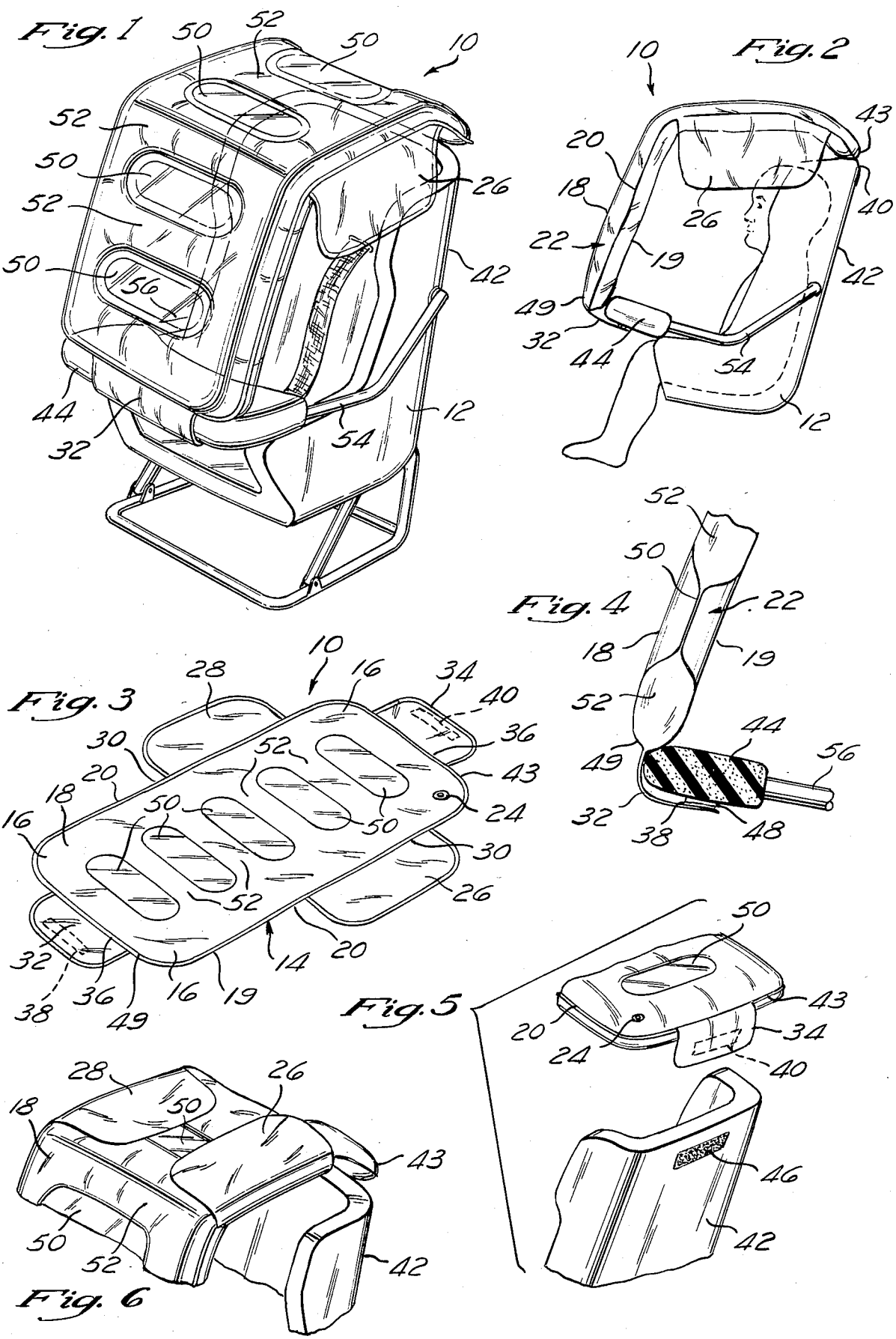

SUNSHADE AND PROTECTIVE DEVICE

BACKGROUND OF THE INVENTION

This invention relates generally to sunshades and protective cushion devices and particularly to sunshades and impact absorbing devices for use with automobile seats for infants and small children. Still more particularly, this invention relates to an inflatable sunshade and cushioning device that may be demountably attached to an automobile seat for infants and small children and which absorbs impacts to prevent injury to the occupant during collisions and sudden changes in velocity of the automobile.

It is well known that safety considerations dictate that an infant passenger in an automobile should be restrained within a specially designed seat rather than being held in the arms of an adult. High accelerations caused by automobile collisions and sudden applications of the brakes to avoid collisions can develop forces sufficient to remove a child from the grasp of even a very strong adult. Such forces arise as a consequence of Newton's second law of motion, which is often expressed mathematically as $F=ma$, where F is the force on an accelerating object, m is the mass of the object and a is the acceleration of the object. Accelerations of 10 to 20 times the acceleration of gravity are not uncommon in automobile collisions, in which case the force felt by a person attempting to restrain a child would be 10 to 20 times the child's weight. Another viewpoint of the problem is that an unrestrained child would continue to move at the initial velocity of an automobile just before a collision whereas the automobile has essentially stopped. The child would then probably collide with the interior of the automobile at a high speed and suffer injury.

Lap and shoulder belts designed for adults and large children typically do not provide adequate restraint for infants and small children who tend to slide out of such devices. In recognition of the problems associated with infant passengers, many jurisdictions have enacted legislation that requires adults to place infant automobile passengers in specially designed seats.

Although the infant seats have proven a significant benefit to infant safety concerns, there are several difficulties associated with the use of such infant automobile seats. Many children are uncomfortable when strapped or otherwise restrained in such seats. A child becomes particularly uncomfortable when confined to a seat and exposed to sunlight and the resultant heat therefrom. The heating effect of exposure to sunlight and confinement in the seat often causes even a normally well-behaved child to cry or otherwise create a disturbance, which is annoying to other occupants of the automobile and distracting to the driver.

In addition, typical infant automobile seats, while providing adequate protection in the event of a collision, still have insufficient cushioning to avoid causing a great amount of discomfort to a child during sudden changes of speed or direction of the automobile.

Therefore, there is a need in the art for a device for use with a conventional infant seat to protect the child therein against injury and discomfort in both major and minor collisions, while at the same time, shading the occupant of the seat from exposure to the uncomfortable heating effects of sunlight.

SUMMARY OF THE INVENTION

The present invention specifically overcomes and alleviates the deficiencies of prior infant automobile seat devices in cushioning against the effects of collision and shielding an infant from exposure to the heating effects of sunlight.

The present invention comprises an inflatable cushioning device having a first end adapted for attachment to the infant car seat behind the infant's head and a second end for attachment to a portion of the infant car seat in front of the infant. The device thus covers the infant occupant while leaving side openings for ventilation and access to the occupant. The cushioning device is preferably formed of a flexible plastic material of a color sufficiently dark to absorb an appreciable portion of sunlight incident thereon to protect the child from exposure to sunlight and resultant discomfort from excessive heat. The device preferably includes sideflaps that maybe extended selectively downward from the portion just above the infant's head to prevent sunlight from impinging upon the sides of the infant or alternatively, stowed so as not to obstruct vision of the occupant.

BRIEF DESCRIPTION OF THE DRAWINGS

These as well as other features of the present invention will become more apparent upn reference to the drawings wherein:

FIG. 1 is a perspective view of the sunshade and cushion device of the invention attached to an infants automobile seat;

FIG. 2 is a side view of a sunshade and cushion device of FIG. 1 in use to protect an infant;

FIG. 3 is a perspective view of the sunshade and protective device of FIG. 1 in a deflated, flattened condition;

FIG. 4 is a side view in an expanded scale showing attachment of the invention to the front portion of the infant's seat;

FIG. 5 is an exploded perspective view showing a method of attachment of the invention to the upper portion of the seat back; and FIG. 6 is a perspective view of the invention showing sideflaps folded over the upper portion of the device.

DESCRIPTION OF THE PREFERRED EMBODIMENT

Referring to FIG. 1, the sunshade and cushion device 10 of the present invention is shown, attached to a conventional infant seat 12 that is preferably of a type designed for use in an automobile (not shown).

FIG. 3 shows the device 10 in a flattened, outfolded form. The device 10, as shown in FIG. 3, includes a generally rectangular portion 14 having somewhat rounded corners 16. The rectangular portion 14, as shown, comprises a pair of substantially identically formed vinyl plastic sheets 18, 19 sealingly joined together at a peripheral seam 20 as by way of heat rolling and or sonic welding techniques. There is an air space 22 between the sheets 18, 19 as best shown in FIGS. 2 and 4. The device includes a conventional air inlet and closure cap 24 as shown in FIG. 3.

A pair of sideflaps 26 and 28 extend from the longer sides 30 of the rectangular portion 14, and a pair of connectors 32 and 34 extend from a narrower ends 36. The sideflaps 26 and 28 as shown are not inflatable, but they may be inflatable for particular applications. The connectors 32 and 34 and the sideflaps 26 and 28 ordinarily are formed of a suitably flexible plastic material. Lengths 38 and 40 of hook and loop tape may be attached to the connectors 32 and 34, respectively.

As best shown in FIGS. 2, 4 and 5, the seat 12 has a back 42 that extends upward beyond the head of an infant in the seat and a front bar 44 that is hingedly positioned in front of the occupant. The seatback 42 preferably is modified to include a length 46 of hook and loop tape formed to mate with the length 40 of hook and loop tape on the connector 32. The lengths 40 and 46 of hook and loop tape mesh together to demountably couple an end 43 of the device 10 to the seatback 42. Similarly, a portion of the bar 44 includes a length 48 of hook and loop tape that meshes with the length 38 of hook and loop tape on the connector 34 to demountably couple the other end 49 of the device 10 to the bar 44.

Forcing pressurized air through the air inlet 24 inflates the airspace 22. The layers 18 and 19 are formed such that inflation of the air space 22 therebetween forces the device 10 to assume a semi-rigid yet deformable generally curved configuration (as shown in FIGS. 1 and 2) to facilitate attachment to the seat 12, while being spaced from the head of the infant occupant.

As best shown in FIGS. 1, 3 and 4, a plurality of substantially flat panels 50 are preferably included in the device 10 wherein the layers 18 and 19 are sealingly secured together such that the region of the flattened panels is not inflated. A space 52 between each of the panels 50, is inflatable so that when the device 10 is inflated the flattened panels 50 and the spaces 52 cooperate to form ribs which yield a corrugated configuration appearance along the length of the rectangular portion 14. The corrugated configuration serves to permit the generally curved rectangular portion 14 to be flexed or moderately folded as shown in FIGS. 1 and 2 as may be necessary when the ends of the device 10 are mounted to the seatback 42 and the bar 44 of the seat 12. The corrugated configuration also prevents the panels 18 and 19 from spreading apart more than a predetermined distance as the airspace 22 is pressurized. The flattened panels 50 and inflated spaces 52, therebetween, cause the device to remain in an essentially rectangular configuration rather than assuming a generally tubular, or perhaps pillow-like shape, both of which would be inappropriate for mounting to the infant seat 12.

When in use, the device 10 is mounted to the infant seat 12 as shown in FIGS. 1 and 2. The bar 44 may be attached between a pair of arms 54 and 56 that are rotatably connected to the seatback 12. The device 10 when inflated is sufficiently flexible that the arms 54 and 56 may be purposefully rotated upward when it is desired to place the child in the seat 12 or remove the child therefrom yet sufficiently firm to normally remain in its generally curved configuration so as to be spaced from the head and body of the child occupant and thereby eliminate any direct contact and possibility of suffication to the child. When positioned in such a manner, it will be recognized that the device 10 forms a sun barrier or screen about the child which filters incident impinging upon the child. The flaps 26 and 28 may be either extended downward as shown in FIGS. 1 and 2 or folded or stowed above the rectangular portion 14 as shown in FIG. 6 when there is no sunlight laterally incident upon the child occupant.

The device 10 is preferably formed of a material such as dark color tinted semi-transparent vinyl plastic which shields the infant inside the seat from direct rays of sunlight. When inflated, as described above, the device additionally serves as a cushion to prevent injury to the child in the event of sudden starts, stops or collisions of the automobile. The material of which the device 10 is formed preferably permits some light to travel therethrough so that the child may see through the device 10 and so that an adult may see through the device 10 to visually monitor the childs behavior and ascertain his well being.

In addition to the seen shade and safety benefits made possible by use of the present invention, the device 10 may advantageously be removed from the seat 12 and placed upon a support surface to serve as a soft portable changing table for infants. Further, when not in use, the device 10 may be deflated and folded in a compact configuration sufficient to be carried in a purse, glove compartment or trunk of the user.

Although for purposes of description, certain materials, dimensions and configurations have been defined, those skilled in the art will recognize that modifications can be made to the same without departing from the spirit of the invention, and such modifications are contemplated herein.

What is claimed is:

1. A device for use with an infant automobile seat or the like having a seatback that extends above the infants head and a front bar portion in front of the infant to serve as a shield against the heating effects of incident sunlight and to serve as a protective cushion for preventing injury to an occupant of the seat during sudden changes of velocity, comprising:
   a first sheet of a flexible material;
   a second sheet of a flexible material bound to the first sheet to form an airspace therebetween;
   a sealable inlet in the first sheet for admitting a pressurized gas into the air space; and
   means for attaching the first and second sheets between the seatback and the frontbar portion, said first and second sheets being formed to assume a generally curved configuration having sufficient structural integrity to extend over an infant occupant of the seat without additional structural support, to shield the infant occupant from sunlight and concurrently cushion the infant occupant against injury due to sudden changes in velocity of the automobile.

2. The device of claim 1 further comprising a pair of flaps extending from the periphery of the first and second sheets for shielding the occupant from laterally incident sunlight.

3. The device of claim 2 further including means for connecting selected portions of the first and second sheets together to form a plurality of panels therein tontrol the displacement between the first and second sheets as the air space is inflated.

4. The device of claim 3 wherein the panels are spaced apart with portions of the air space therebetween to form a generally corrugated configuration when the air space is inflated, the first and second sheets being deformable at the panels to form an arcuate configuration extending from the seatback to the frontbar of the seat.

5. The device of claim 4 wherein the first and second sheets are formed of a material that absorbs sunlight.

6. The device of claim 5 wherein one of the first and second sheets is formed of a material that reflects sunlight.

7. The device of claim 6 wherein the attaching means comprises hook and loop tape.

* * * * *